United States Patent
Pakhchyan et al.

(10) Patent No.: US 7,857,476 B2
(45) Date of Patent: Dec. 28, 2010

(54) DISPLAY BACKLIGHT INCLUDING AN ARRAY OF OPTICAL WAVEGUIDES

(76) Inventors: Edward Pakhchyan, 710 N. Mariposa St., Burbank, CA (US) 91506; Haik Mesropian, 417 Nolan Ave., Glendale, CA (US) 91202; Syuzi Pakhchyan, 612 Luton Dr., Glendale, CA (US) 91202

( * ) Notice: Subject to any disclaimer, the term of this patent is extended or adjusted under 35 U.S.C. 154(b) by 114 days.

(21) Appl. No.: 12/157,411

(22) Filed: Jun. 9, 2008

(65) Prior Publication Data
US 2009/0303745 A1    Dec. 10, 2009

(51) Int. Cl.
*F21V 7/04* (2006.01)
*G04F 1/13357* (2006.01)

(52) U.S. Cl. .............. 362/97.3; 362/97.2; 362/612; 362/616; 362/618; 362/627

(58) Field of Classification Search .......... 362/97.2, 362/97.3, 612, 616, 618, 627
See application file for complete search history.

(56) References Cited

U.S. PATENT DOCUMENTS

| | | | |
|---|---|---|---|
| 7,293,908 B2 * | 11/2007 | Beeson et al. | 362/612 |
| 7,543,972 B2 * | 6/2009 | Huang et al. | 362/616 |
| 2005/0213347 A1 * | 9/2005 | Kajiura | 362/615 |
| 2008/0252818 A1 * | 10/2008 | Wu et al. | 349/65 |
| 2009/0303743 A1 * | 12/2009 | Pakhchyan et al. | 362/609 |

* cited by examiner

*Primary Examiner*—Stephen F Husar
*Assistant Examiner*—James W Cranson (57) ABSTRACT

A backlight assembly includes an array of optical waveguides that are arranged in rows and columns. The array of optical waveguides has a planar upper surface substantially comprised of light exit facet of optical waveguides and spaced-apart lower surface substantially comprised of light input facet of optical waveguides. Backlight assembly also includes a light reflector panel that is spaced-apart from the lower surface of the array. Disposed between reflector panel and the lower light input facet of the optical waveguides are light sources. Light sources comprise light emitting diodes having 120 degree emission angles.

23 Claims, 6 Drawing Sheets

DISPLAY BACKLIGHT INCLUDING AN ARRAY OF OPTICAL WAVEGUIDES

BACKGROUND OF THE INVENTION

1. Field of the Invention

The present invention relates generally to backlight systems for illumination of large area displays. More particularly the invention concerns backlight systems for high dynamic range displays based on liquid crystal and micro-electromechanical light modulators.

2. Discussion of the Prior Art

Backlight assemblies provide a planar light source for transmissive displays. More common light sources used in display backlighting include cold cathode fluorescent lamps (CCFL) and light emitting diodes (LED's).

Depending on the positioning of light sources, the backlight systems may be grouped either "edge-lit" or "direct-lit". Edge-lit backlight systems typically include a light source, a thin rectangle shaped optical waveguide, a reflector, or a diffuser at the back of optical waveguide and prism films mounted between the waveguide and the display panel. The primary drawback of edge-lit backlight systems is their inability to illuminate large displays. Inefficient light coupling and concentrated heat generated from the light sources tend to limit the size of edge-lit backlight systems.

In direct-lit backlight systems, a plurality of light sources are generally evenly distributed along the display area and each of the light sources directly illuminates a small segment of the display. In order to achieve relatively uniform illumination, the light sources are typically assembled on a reflective panel and placed at a relatively great distance from the display. Additionally, a volume diffuser is often placed between the light sources and the display panel.

High dynamic range displays typically include two displays, the first display functioning to modulate the light and to illuminate the second display that further modulates light. For example, in high dynamic range LCD displays having LED backlights, the LEDs are modulated to provide an area-adaptive backlight. Currently, high dynamic range LCD displays use direct-lit backlight systems of the character previously described. These systems typically exhibit several problems, including the fact that each LED illuminates the display segment of other LEDs. This is referred to as crosstalk. In this regard, each LED has its own crosstalk pattern which requires extensive computation and causes visual artifacts. Further, in such systems, display depth is increased as a result of the required distance from the LEDs to the display panel. Additionally, such systems tend not to be efficient due to the required multiple reflections from the reflector panel and the use of a volume diffuser.

SUMMARY OF THE INVENTION

It is an object of the present invention to provide a homogenized and highly efficient backlight assembly for uniform illumination of large area displays.

It is another object of this invention to provide a backlight assembly that effectively overcomes the drawbacks of prior art direct-lit and edge-lit backlight systems.

It is another object of this invention to provide a backlight assembly that exhibits highly efficient light coupling between the light sources and the waveguide of the assembly.

It is another object of this invention to provide backlight assembly of the character described in the preceding paragraphs that is easily scalable for displays of different sizes.

The foregoing as well as other objects of the invention will be achieved by the novel backlight assembly illustrated in the accompanying drawings and described in the specification that follows.

DESCRIPTION OF THE INVENTION

Figure 1:
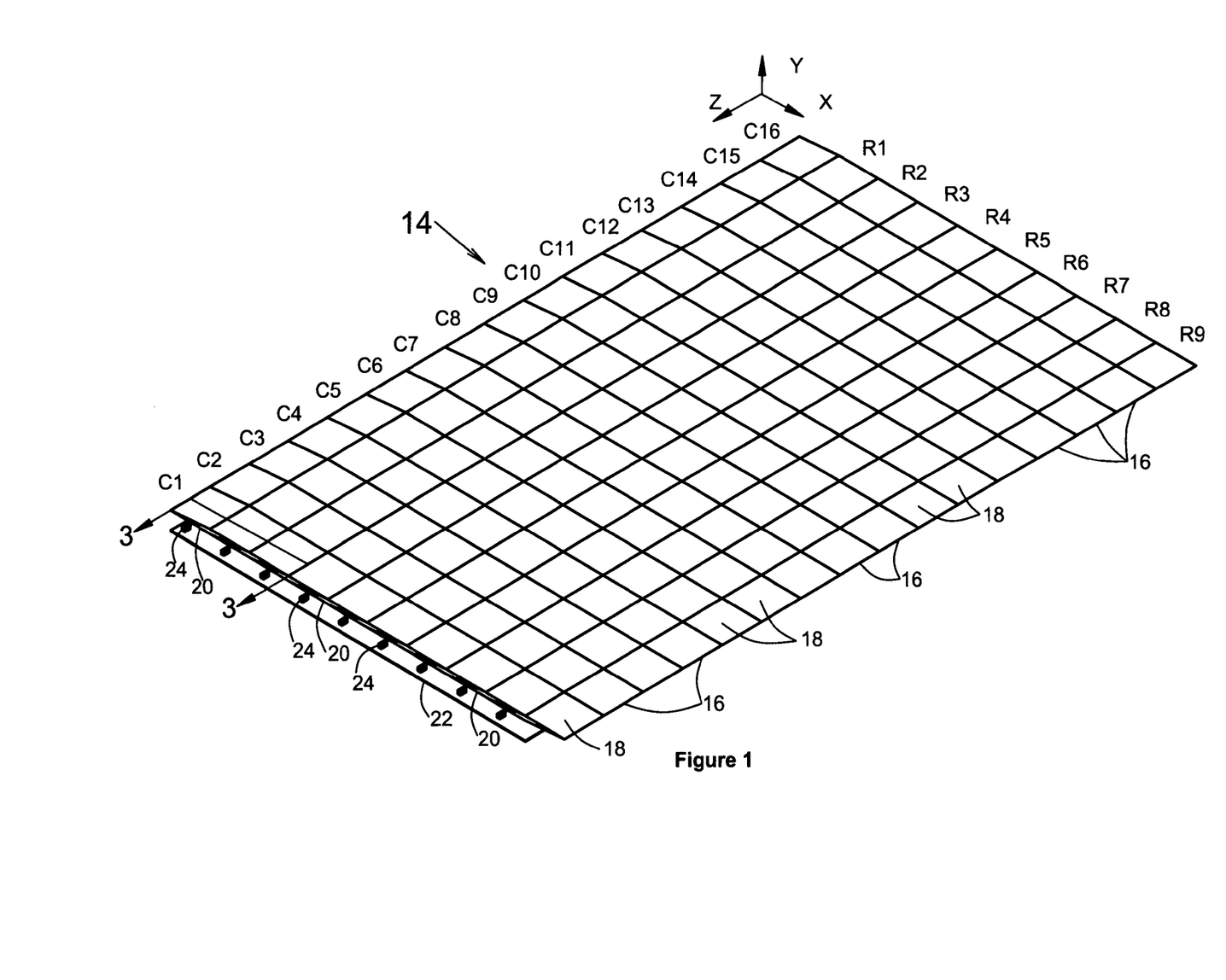
FIG. 1 is a generally perspective view of one form of backlight assembly of the present invention.

Referring to the drawings and particularly to FIG. 1, one form of the backlight assembly of the invention is there shown and generally designated by the numeral 14. Backlight assembly 14 here includes an array of optical waveguides 16 that are arranged in nine rows designated as R1-R9 and in sixteen columns designated as C1-C16. As illustrated in FIG. 1, the array of optical waveguides 14 has a generally planar upper surface that comprises the light exit facets 18 of optical waveguides 16 and a spaced-apart lower surface that comprises light input facet 20 of optical waveguides 16. Backlight assembly 14 also includes a light reflector panel 22 that is spaced-apart from the lower surface of the array. Disposed between reflector panel 22 and the lower light input facet 20 of the optical waveguides 16 are light sources 24. In this embodiment of the invention, light sources 24 comprise side-mounted light emitting diodes having 120 degree emission angles that emit light in the direction of X-axis.

Figure 2:
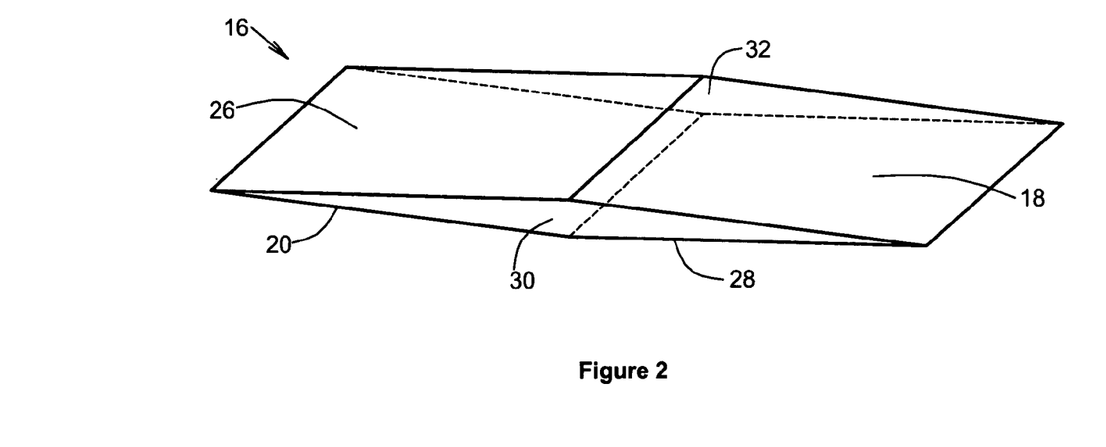
FIG. 2 is a generally perspective view of the optical waveguide component of the invention.

Referring to FIG. 2 of the drawings, a perspective view of one of the optical waveguides 16 of the invention is shown there. Waveguide 16 is preferably constructed from a substantially optically transparent material such as acrylic and comprises an upper light exit facet 18 and a spaced apart lower light input facet 20. Disposed between light exit facet 18 and light input facet 20 is an upwardly inclined upper light reflecting facet 26 and an upwardly inclined lower light reflecting facet 28. Waveguide 16 further includes light reflecting side facets 30 and 32. In this form of the invention, a specularly reflective coating is formed on the upwardly inclined facets 26 and 28, and side facets 30 and 32 of the waveguide 16. Also in this form of the invention, light reflecting facets 26 and 28 are substantially parallel and extend upwardly at an angle of between approximately two degrees and approximately fifteen degrees.

Figure 3:
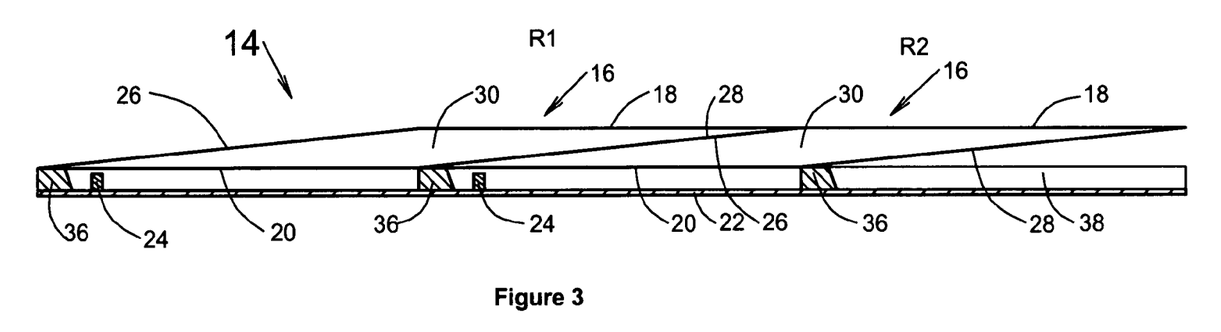
FIG. 3 is a side-elevation view, partly in cross-section, of the backlight assembly shown in FIG. 1.

FIG. 3 is a side view of the first two rows R1 and R2 of the backlight assembly 14 shown in FIG. 1. As shown in FIG. 3, the lower light reflecting facet 28 of the optical waveguide 16 disposed in row R1 and the upper light reflecting surface 26 of the optical waveguide 16 disposed in row R2 are assembled together by means of an adhesive. Also illustrated in FIG. 3 are spacers 36 and 38 that have reflective surfaces and are installed between the optical waveguides 16 and the reflector panel 22. Spacers 36 block light propagation between rows and spacers 38 block light propagation between columns of the backlight assembly 14. In this form of the invention, the light sources 24 have provided as side emitting LEDs are installed on the far left side of each of the optical waveguides 16 proximate the spacers 36.

Figure 4:
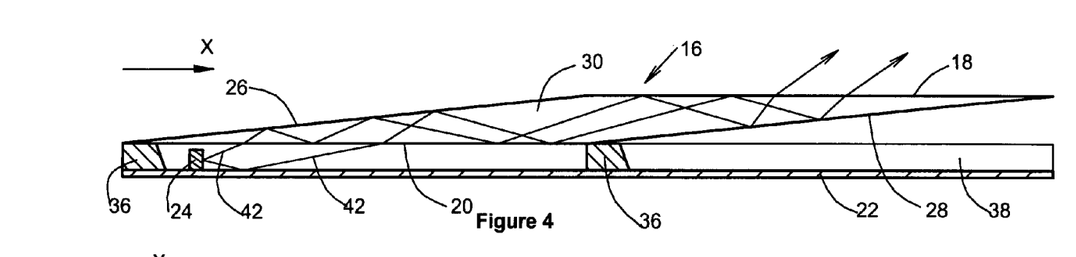
FIG. 4 is a cross-sectional view illustrating light coupling into the optical waveguide.

Light emitted from LEDs or light sources 24 require a long light path in order to effectively homogenize and mix colors from discrete color LEDs. FIG. 4 illustrates light coupling into the waveguide 16 from the light sources 24. As shown in FIG. 4, certain of the light rays 42 that are generated by the light sources 24 enter the waveguide 16 directly from the light input facets 20. Depending on the angles at which the light rays 42 are generated by the light sources 24, some light rays reflect from the upper surface of reflector panel 22 and also enter the waveguides 16 from the light input facets 20. Inside the waveguide 16, light rays 42 propagate in the X-axis direction by total internal reflections (TIR) from the upwardly inclined upper light reflecting facets 26 and from the light input facets 20. Multiple reflections inside the waveguide effectively homogenize light and mix colors from discrete color LEDs.

Figure 5:
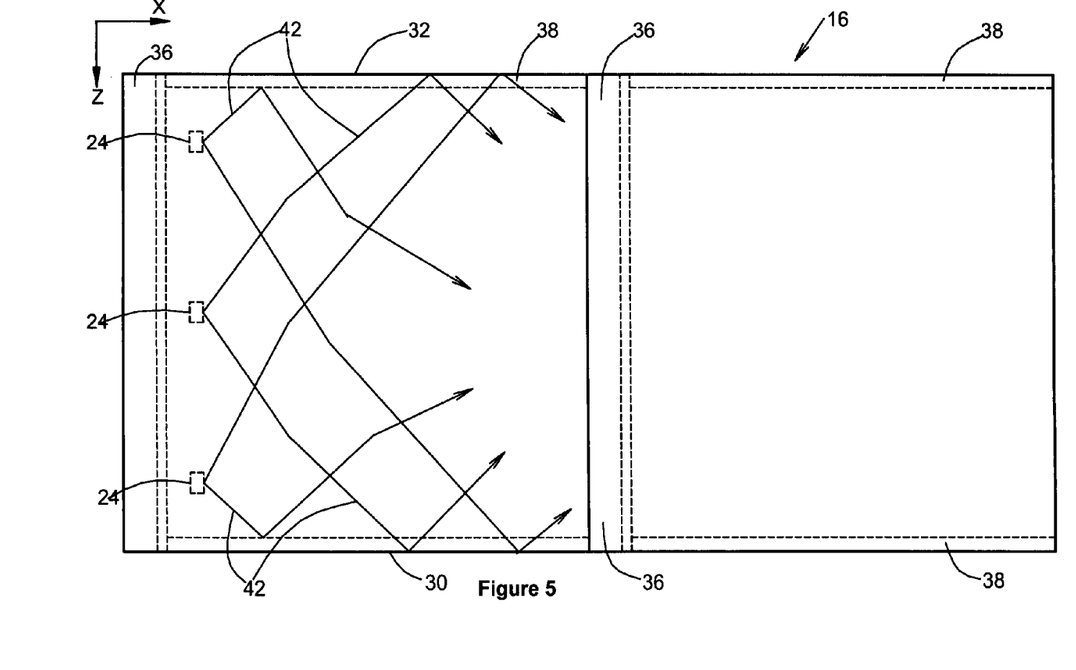
FIG. 5 is a top view illustrating light distribution in the optical waveguide.

FIG. 5 illustrates light mixing from the plurality of light sources 24 along the Z-axis. Light rays 42 generated from the light sources 24 reflect from the side spacers 38 outside of the waveguide 16 and, after entering the waveguide, reflect from side facets 30 and 32 of the waveguide substantially by total internal reflections.

Figures 6, 7:
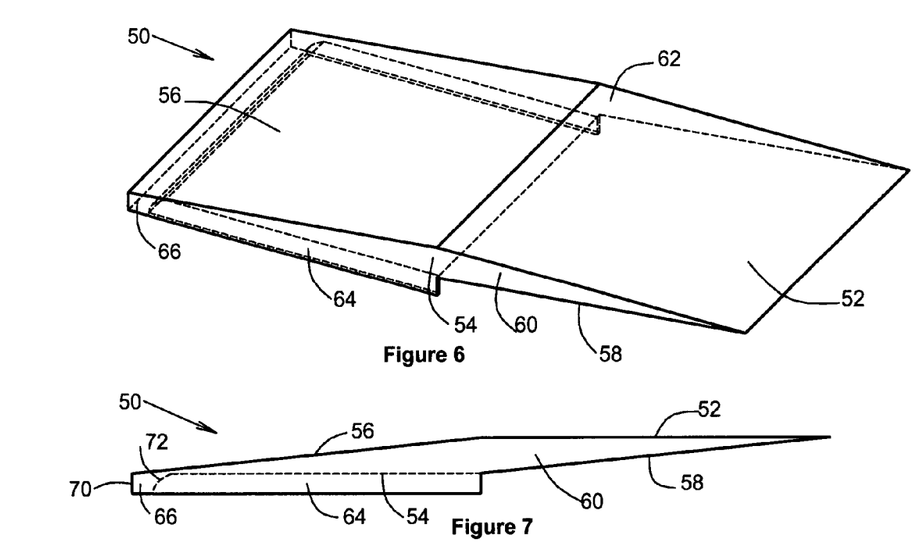
FIG. 6 is a generally perspective view of another form of optical waveguide of the invention.
FIG. 7 is a side-elevation view of optical waveguide shown in FIG. 6.

FIGS. 6 and 7 of the drawings illustrate an alternate form of an optical waveguide that is generally designated by the numeral 50. An important feature of waveguide 50 resides in the provision of integral spacers that are molded together with the waveguide to form an integral structure. Waveguide 50 is preferably constructed from a substantially optically transparent material such as acrylic and includes an upper light exit facet 52, a spaced apart lower light input facet 54, an upwardly inclined upper light reflecting facet 56, an upwardly inclined lower light reflecting facet 58 and light reflecting side facets 60 and 62. Waveguide 50 also includes side spacers 64 and a back spacer 66 that extend below light input facet 54. In this latter form of the invention, a specularly reflective coating is applied to the upwardly inclined facets 56 and 58, and each of side facets 60 and 62 of the waveguide 50. Also, a specularly reflective coating is applied to the outside facets of spacers 64 and to facets 70 and 72 of the spacer 66.

Figure 8:
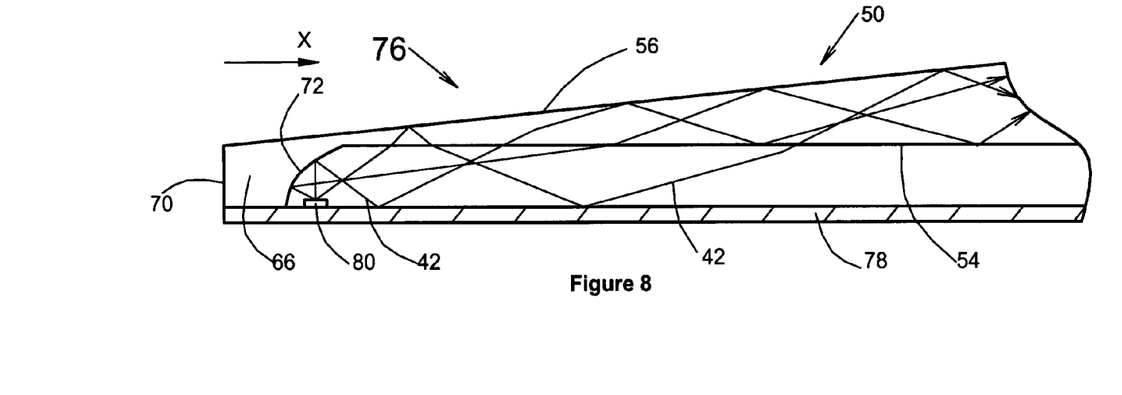
FIG. 8 is an enlarged, fragmentary side-elevation view of an alternate form of backlight assembly of the invention.

FIG. 8 illustrates still another embodiment of the backlight assembly of the invention. This alternate form of backlight assembly, which is generally designated as 76, is similar in some respects to the previously described embodiments and like numerals are used to identify like components. Assembly 76 includes an array of optical waveguides 50 and includes a reflector panel 78 upon which top emitting LEDs 80 are installed proximate spacer 66. Light rays 42 that are emitted from the LEDs 80 reflect from curved facet 72 and from the upper surface of reflector panel 78 and enter the waveguide from the light input facet 54. As before, inside the waveguide 50, light rays 42 propagate in the X-axis direction by total internal reflections (TIR) from the upwardly inclined upper light reflecting facet 56 and from the light input facet 54. Multiple reflections inside the waveguide effectively homogenize light and mix colors from discrete color LEDs.

Figure 9:
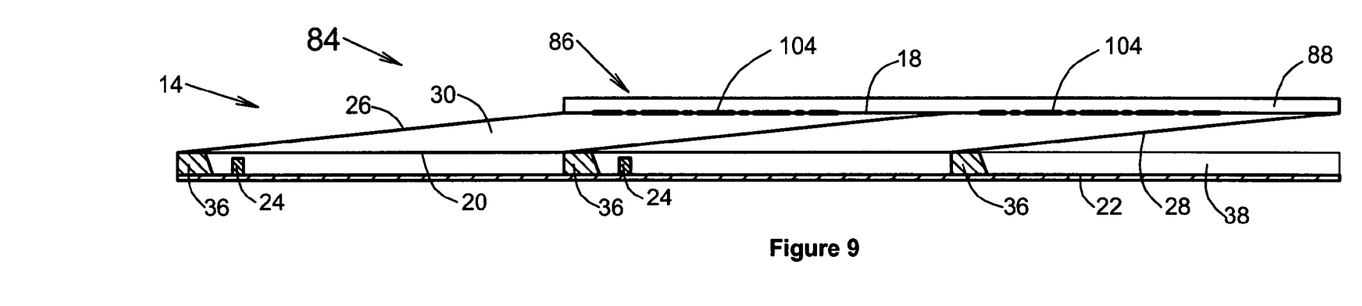
FIG. 9 is a side-elevation view of a display system incorporating the backlight assembly of present invention.
Figure 10:
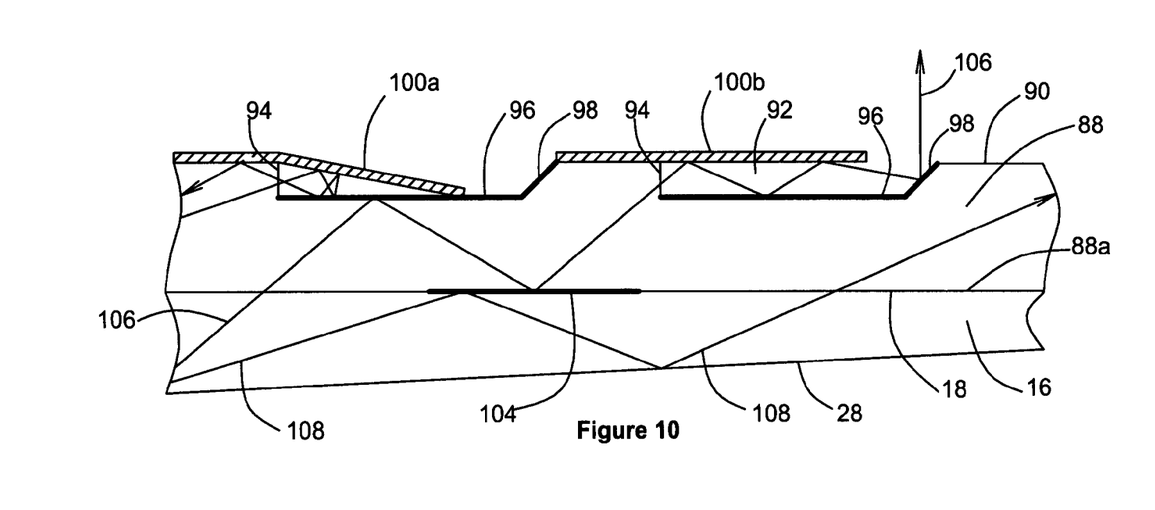
FIG. 10 is an enlarged fragmentary view of the display system of FIG. 9.

FIG. 9 depicts a display system 84 with which the backlight assemblies 14 of the invention can be used. The display system 84 includes the backlight assembly 14 and the display panel 86. An enlarged portion of the display panel 86 and the optical waveguide 16 of the backlight assembly 14 is illustrated in FIG. 10. The display panel 86 here includes a generally rectangular shaped substantially transparent substrate 88 having an upper surface 90 upon which a plurality of substantially equally spaced-apart grooves 92 are formed. Each groove 92 comprises three optically flat facets 94, 96 and 98. As illustrated in FIG. 10, optically flat facets 94 are inclined downwardly at a relatively steep angle of between about 80 and 90 degrees with respect to the upper surface 90. Second facets 96 are recessed from and generally parallel to upper surface 90, while facets 98 are upwardly inclined at angles between about 45 and about 60 degrees with respect to upper surface 90. A conductive specularly reflective mirror film formed from a material such as an aluminum alloy is deposited on facets 96 and 98. FIG. 10 also illustrates tilting micro-mirrors 100a and 100b that are made of a thin aluminum alloy elastic film and are affixed to the upper surface 90 of the substrate 88. The tilting micro-mirrors operate by electrostatic attraction force and by the counter spring forces generated by the elastic film. The conductive mirror films formed on facets 96 of grooves 92 act as fixed electrodes for the tilting micro-mirrors. When a suitable voltage is applied between the fixed conductive mirror films and a micro-mirror, the micro-mirror tilts by electrostatic attraction force and, when no voltage is applied, the micro-mirror is returned to the flat position by the counter spring force of the elastic film.

The display panel 86 operates more efficiently when it is optically coupled to a backlight. Therefore the lower surface 88a of the substrate 88 is optically coupled to the light exit facet 18 of the optical waveguides 16. Light distribution in the display system 84 generally is controlled by the dimensions of the system components and depends on the thickness of the substrate 88, the spacing between the grooves 92, the height of the light exit facets 94 and the angle of upwardly inclined lower light reflecting facet 28 of the waveguides 16. Additionally, light distribution may be controlled by providing a pattern of specularly reflective film 104 formed on the light exit facet 18 of the waveguide 16. As illustrated in FIG. 10, light ray 106 reflects from the upper surface of the reflective film 104 and exits the substrate 88 from facet 94 at the micro-mirror 100b. Also illustrated in FIG. 10, light ray 108 reflects from the lower surface of the reflective film 104 and propagates further down the stream.

It is to be noted that some prior art display panels, such as liquid crystal panels, operate with diffused planar light sources.

Figure 11:
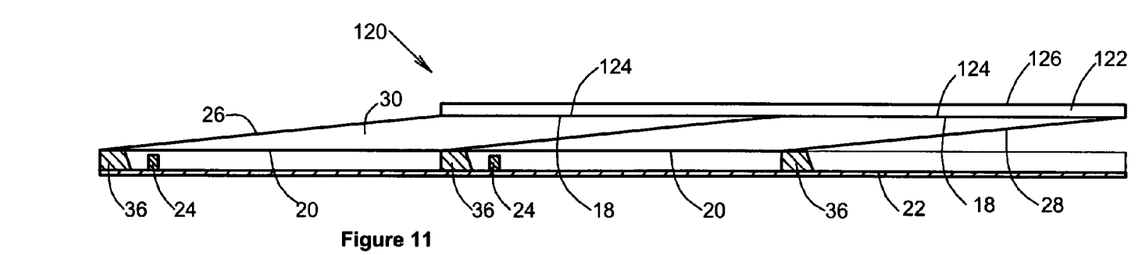
FIG. 11 is a side-elevation view of still another form of backlight assembly of the invention.
Figure 12:
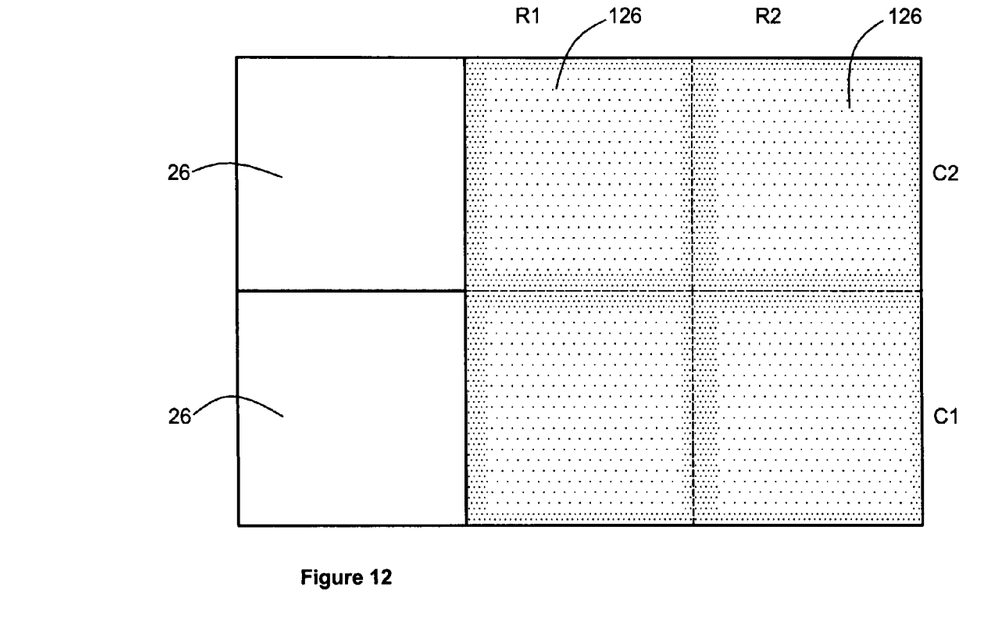
FIG. 12 is a top view of backlight assembly shown in FIG. 11.

FIG. 11 illustrates backlight assembly 120 that can be used for illuminating a liquid crystal panel. The important feature of this latest assembly is the addition of substantially transparent plate 122 that is constructed from an acrylic. Transparent plate 122 is approximately 1 mm thick and includes a lower surface 124 that is optically coupled to the light exit facet 18 of each of the waveguides 16 by means of a refractive index matching optical adhesive. A light diffuser surface is formed on the upper surface 126 of the substantially transparent plate 122. The diffusion efficiency varies across the upper surface 126 by varying the ratio of flat and embossed surfaces. This is illustrated in FIG. 12. The diffusion efficiency is increased along the junctions and at the edges of the waveguides 16. Additionally, if desired a pattern of a reflective diffuser can be printed on the upwardly inclined lower light reflecting facet 28 of waveguides 16.

Having now described the invention in detail in accordance with the requirements of the patent statutes, those skilled in this art will have no difficulty in making changes and modifications in the individual parts or their relative assembly in order to meet specific requirements or conditions. Such changes and modification may be made without departing from the scope and spirit of the invention, as set forth in the following claims.

We claim:

1. A display backlight apparatus comprising: a plurality of adjacently disposed optical waveguides, each said optical waveguide comprising an upper light exit facet, a spaced-apart lower light input facet, a plurality of side light reflecting facets, an upwardly inclined upper light reflecting facet and an upwardly inclined lower light reflecting facet disposed between said upper light exit facet and said lower light input facet.

2. The display backlight apparatus as defined in claim 1 in which said apparatus includes an upper surface and a spaced-apart lower surface, said upper surface being formed by said upper light exit facets of said adjacently disposed optical waveguides and said spaced-apart lower surface being formed by said lower light input facets of said adjacently disposed optical waveguides.

3. The display backlight apparatus as defined in claim 1 in which said upwardly inclined upper light reflecting facet of each said optical waveguide of said plurality of optical waveguides extends upwardly at an angle between approximately two degrees and approximately fifteen degrees.

4. The display backlight apparatus as defined in claim 1 in which said upwardly inclined lower light reflecting facet of each said optical waveguide of said plurality of optical waveguides extends upwardly at an angle between approximately two degrees and approximately fifteen degrees.

5. The display backlight apparatus as defined in claim 1 in which each said optical waveguide of said plurality of optical waveguides further includes a specularly reflective coating formed on said plurality of side light reflecting facets and on said upwardly inclined light reflecting facet.

6. The display backlight apparatus as defined in claim 1 in which said upwardly inclined upper light reflecting facet is substantially parallel to said upwardly inclined lower light reflecting facet of each said optical waveguide of said plurality of optical waveguides.

7. The display backlight apparatus as defined in claim 1 in which said upper light exit facet is substantially parallel to said spaced-apart lower light input facet of each said optical waveguide of said plurality of optical waveguides.

8. The display backlight apparatus as defined in claim 1 in which each said optical waveguide of said plurality of optical waveguides further includes a pattern of specularly reflective coating formed on said upper light exit facet.

9. The display backlight apparatus as defined in claim 1 further includes a transparent plate having a lower surface optically coupled to said upper light exit facet each of said optical waveguides of said plurality of optical waveguides.

10. The display backlight apparatus as defined in claim 1 in which said optical waveguides of said plurality of optical waveguides are arranged in rows and columns.

11. A display backlight apparatus having an upper surface and a spaced-apart lower surface and comprising: a plurality of adjacently disposed optical waveguides, each said optical waveguide comprising an upper light exit facet, a spaced-apart lower light input facet, a plurality of side light reflecting facets, an upwardly inclined upper light reflecting facet and an upwardly inclined lower light reflecting facet disposed between said upper light exit facet and said lower light input facet, said upper surface of said apparatus being formed by said upper light exit facets of said adjacently disposed optical waveguides and said spaced-apart lower surface of said apparatus being formed by said lower light input facets of said adjacently disposed waveguides.

12. The display backlight apparatus as defined in claim 11 in which said optical waveguides of said plurality of optical waveguides are arranged in rows and columns.

13. The display backlight apparatus as defined in claim 12 in which said upwardly inclined upper light reflecting facet of each said optical waveguide of said plurality of optical waveguides extends upwardly at an angle between approximately two degrees and approximately fifteen degrees.

14. The display backlight apparatus as defined in claim 13 in which said upwardly inclined lower light reflecting facet of each said optical waveguide of said plurality of optical waveguides extends upwardly at an angle between approximately two degrees and approximately fifteen degrees.

15. The display backlight apparatus as defined in claim 14 in which said upwardly inclined upper light reflecting facet is substantially parallel to said upwardly inclined lower light reflecting facet of each said optical waveguide of said plurality of optical waveguides.

16. The display backlight apparatus as defined in claim 15 in which said upper light exit facet is substantially parallel to said spaced-apart lower light input facet of each said optical waveguide of said plurality of optical waveguides.

17. The display backlight apparatus as defined in claim 16 in which each said optical waveguide of said plurality of optical waveguides further includes a specularly reflective coating formed on said plurality of side light reflecting facets, and on said upwardly inclined light reflecting facet.

18. The display backlight apparatus as defined in claim 16 in which each said optical waveguide of said plurality of optical waveguides further includes a pattern of specularly reflective coating formed on said upper light exit facet.

19. The display backlight apparatus as defined in claim 16 further includes a transparent plate having a lower surface optically coupled to said upper light exit facet each of said optical waveguide of said plurality of optical waveguides.

20. A display apparatus comprising: a substantially transparent substrate having an upper surface and a spaced-apart lower surface, a plurality of micro-electromechanical light modulators formed on said upper surface of said transparent substrate, a plurality of adjacently disposed optical waveguides, each said optical waveguide having an upper light exit facet optically coupled to said spaced-apart lower surface of said transparent substrate and a spaced-apart lower light input facet.

21. The display apparatus as defined in claim 20 in which each said optical waveguide of said plurality of optical waveguides further includes a pattern of specularly reflective coating formed on said upper light exit facet.

22. The display apparatus as defined in claim 20 in which each said optical waveguide of said plurality of optical waveguides further includes a plurality of side light reflecting facets, an upwardly inclined upper light reflecting facet and an upwardly inclined lower light reflecting facet disposed between said upper light exit facet and said lower light input facet of each said optical waveguide of said plurality of optical waveguides.

23. The display apparatus as defined in claim 22 in which each said optical waveguide of said plurality of optical waveguides further includes a specularly reflective coating formed on said plurality of side light reflecting facets and on said upwardly inclined light reflecting facet.

* * * * *